Wayne N. Hill INVENTOR.

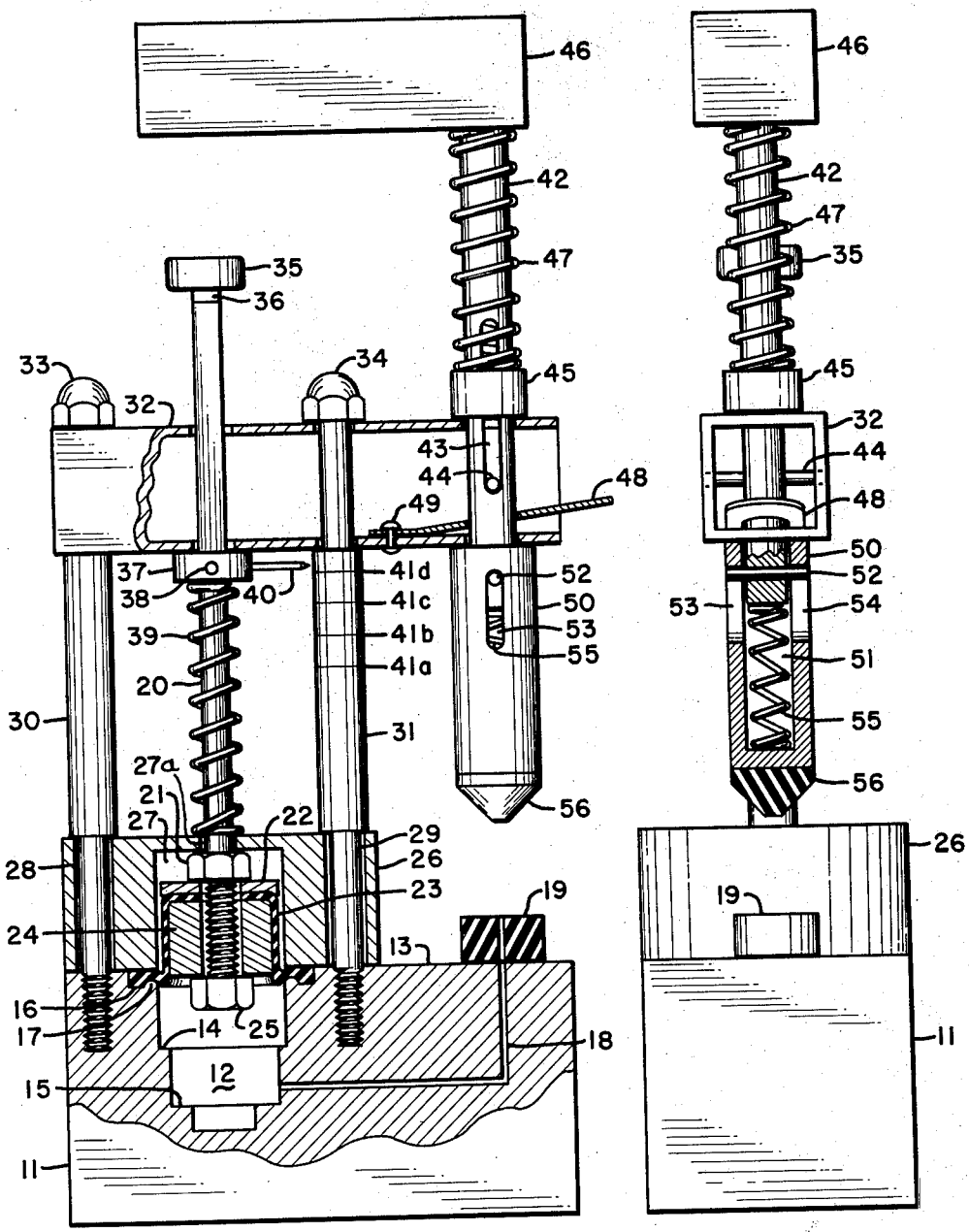

United States Patent Office 3,102,416
Patented Sept. 3, 1963

3,102,416
PERMEABILITY MEASURING DEVICE
Wayne N. Hill, Tulsa, Okla., assignor to Jersey Production Research Company, a corporation of Delaware
Filed Apr. 21, 1961, Ser. No. 104,560
4 Claims. (Cl. 73—38)

The present invention relates to apparatus for determining the properties of solids and more particularly relates to an improved device for measuring the permeability of small particles of rock or similar material. In still greater particularity, the invention relates to an improved permeameter which permits determination of the permeability of drill cuttings or the like more rapidly and with greater accuracy than has generally been possible heretofore.

Permeability is normally considered a measure of the resistance offered by a porous medium to the flow of fluids through the pores of the medium and hence its determination is important in the study of oil reservoirs and similar systems. The method ordinarily used to measure permeability in the petroleum industry is defined by Code 27 of the American Petroleum Institute entitled, "Standard Procedure for Determining Permeability of Porous Media." In brief this method involves the cutting of a selected core sample to obtain a specimen of predetermined size and shape, the sealing of the specimen thus obtained within a special holder, and the forcing of a fluid through the pores of the specimen for a measured period of time under controlled temperature and pressure conditions. The quantity of fluid which passes through the specimen under standard conditions per unit of time indicates the permeability. This method is satisfactory for laboratory purposes but has serious limitations because of the elaborate equipment employed, the time needed for each determination and the relatively large sample of material required. In many instances, permeability information is needed in the field on short notice and in such cases the API standard procedure is of little value. There have been attempts to develop portable permeability measuring devices suitable for use under field conditions but such attempts in general have met with limited success. Experience has shown that instruments advocated heretofore are difficult to use, seldom produce reliable indications of permeability, and are easily damaged during field use. As a result, such instruments have not been widely employed.

It is therefore an object of the present invention to provide an improved instrument which will permit the determination of permeability under field conditions more rapidly and with greater accuracy than has generally been possible in the past.

Another object of the invention is to provide a permeameter of simple construction which is easier to use and less susceptible to damage than devices available heretofore.

The nature of the improved permeameter can best be understood by referring to the following detailed description of a preferred embodiment of the device and to the accompanying drawing, in which:

FIGURE 1 is a side view of the permeameter, depicted in partial section in order to show the internal construction;

FIGURE 2 is an end view of the device, again represented in partial section.

Figure 3:
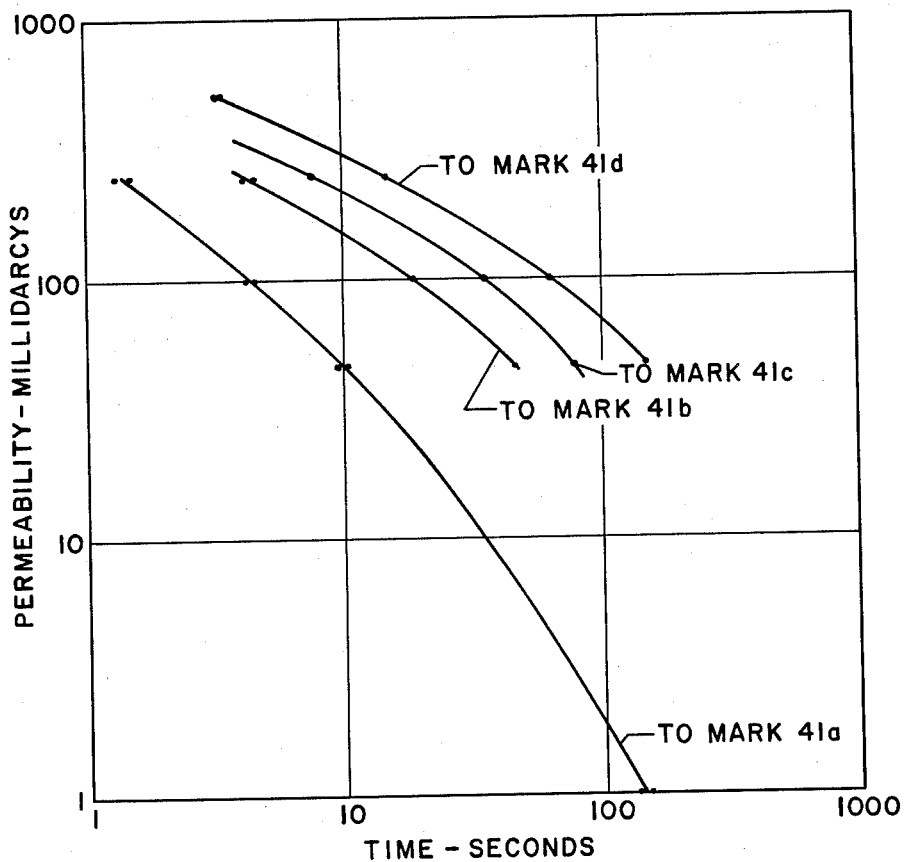
FIGURE 3 illustrates a typical set of calibration curves used with the permeameter shown in FIGURES 1 and 2.

As can be seen from FIGURE 1 of the drawing, the improved permeameter includes a base or supporting member 11 of steel, aluminum or similar material which contains a generally cylindrical chamber 12. The chamber extends at right angles to the upper surface 13 of the base and as shown contains internal shoulders 14 and 15. An annular groove 16 extends around the mouth of the chamber and is separated therefrom by a rounded lip 17. The lip is recessed below the upper surface of the base. A passageway 18 of small diameter extends from a point near the bottom of the chamber to an opening in the top of the base near the front of the permeameter. An annular chip holder 19 of soft rubber or similar material is mounted on the base about the opening. The hole through the chip holder is preferably about one-sixteenth of an inch in diameter. It is preferred that the chip holder be made of butyl rubber or a material having similar elastic properties.

A piston rod 20, threaded at its lower end, extends into chamber 12 in the base. Upper nut 21 is threaded onto the piston rod. Immediately below the upper nut is a circular diaphragm retainer 22. Circular diaphragm 23 of rubber or similar flexible impermeable material is held against the retainer by a cylindrical piston 24 which is in turn held on the piston rod by lower nut 25. The diaphragm has a hole in its center through which the piston rod extends and is provided at its outer edge with a rim which seats in groove 16 in base 11. The diameters of chamber 12 and piston 24 are such that the diaphragm will roll between the walls of the piston and chamber as the piston is moved up and down thus maintaining a seal between the two without causing appreciable friction. Rounded lip 17 surrounding the mouth of the chamber facilitates the rolling action of the diaphragm. The upper edges of the piston should also be rounded slightly. The diameters of the chamber below shoulders 14 and 15 are only slightly larger than those of the piston and lower nut and thus the free volume when the piston assembly is in its lowermost position in the chamber is minimized.

Base cover 26 is mounted atop base 11 and bears against the edge of diaphragm 22 surrounding chamber 12. The cover contains a chamber 27 which opposes chamber 12 in the base and has essentially the same diameter as does chamber 12. The two chambers thus form a cylinder within which the piston assembly operates. Piston rod 20 fits loosely through a port 27a in the cover aligned with the axis of the cylinder. Studs 28 and 29 extend through holes in the cover on either side of the cylinder and are threaded into corresponding holes in the base. The studs are provided with tubular spacers 30 and 31 which bear against the cover and hold it in place. Hollow frame member 32 is positioned on the studs above the spacers and is secured by nuts 33 and 34. The frame member as shown is of rectangular cross-section. Piston rod 20 fits through holes in the frame and extends a sufficient distance above its upper surface to permit clearance of knob 35 at the top of the rod when the piston assembly is in its lowermost position. Notch 36 in the rod engages the upper wall of the frame when the rod is pushed down and moved to the side. This permits locking of the rod and piston assembly in their lowermost position. Spring retainer 37 is mounted on the piston rod so that it abuts against the lower surface of frame 32 when the rod and piston assembly are in the position shown in FIGURE 1 of the drawing. The spring retainer is held in place by pin 38 which extends through a hole in the rod and retainer. Helical spring 39 is positioned on the rod between cover 26 and spring retainer 37 and serves to hold the rod and piston assembly in a normally upward position. Pointer 40 on the spring retainer indicates the position of the rod and piston assembly with respect to reference lines 41 on spacer 31. In the particular embodiment of the permeameter shown in the drawing, there are four reference lines, 41a, 41b, 41c and 41d on the spacer.

Clamping rod 42 extends through holes in the top and bottom of frame 32 above chip holder 19 on base 11. The clamping rod contains a longitudinal slot 43 through which a pin 44 extends. The pin is held in fixed position in holes in the walls of the frame. The slot and pin thus limit axial movement of the rod with respect to the frame. Spacer 45 is mounted on the clamping rod above the frame. Guard 46 is attached to the top of the clamping rod. Helical spring 47 is positioned about the rod between the guard and spacer. The rod is free to slide within the spacer and hence the spring normally holds it in an upward position with respect to the frame. As can be seen from FIGURE 1 of the drawing, the guard extends toward the rear of the apparatus over piston rod 20 and knob 35. When the guard and clamping rod are depressed, the guard prevents the piston rod from being pushed down accidently. Latch spring 48 attached to frame 32 by rivet 49 contains a hole through which the clamping rod extends. The latch spring normally prevents movement of the clamping rod but can be released by depressing it to permit rod movement. Barrel 50 containing cylindrical chamber 51 extends over the lower end of rod 42 below frame 32 and is attached to the rod by means of pin 52. The pin passes through a transverse hole near the bottom of the rod and extends into longitudinal slots 53 and 54 in the wall of the barrel. The pin raises the barrel when rod 42 is lifted by spring 47. The slots limit axial movement of the barrel with respect to the rod. Helical spring 55 positioned between the bottom of the rod and the bottom of chamber 51 normally maintains the rod in an upper position within the barrel. Upper chip holder 56 having a flat lower tip preferably about one-eighth of an inch in diameter is bonded or otherwise affixed to the lower end of the barrel. The upper chip holder may be made of the same material employed for lower chip holder 19.

The permeability of rock or similar material is determined with the permeameter by measuring the time required for the piston spring 39 to force the piston assembly upwardly in the cylinder a selected distance when a chip of the material to be tested is held against the lower chip holder 19 by upper chip holder 56. Since the upper part of the cylinder above the piston is open to the atmosphere and no air can enter the lower part of the cylinder unless it flows through the chip and passageway 18, the rate at which the piston will rise in response to a given spring force is determined by the permeability of the chip. The measured time is inversely proportional to permeability. The time value thus obtained is then compared with time values obtained with standard chips of known permeability. Although chips of various materials may be employed as standards, it is preferred to utilize chips of Alundum or porcelain for this purpose. Alundum is a trademark designating an aluminum oxide abrasive manufactured by the Norton Company of Worcester, Massachusetts in bars having extremely uniform permeability. By taking chips of Alundum or porcelain of different grades, a set of satisfactory standards can readily be obtained. For testing samples of subsurface strata, it is generally preferred that the set of standards include chips having permeabilities of 1, 3, 10, 50, 100, 250 and 500 millidarcys. The standards employed however, are not critical and for some purposes it will be found more convenient to utilize standards having other permeability values. The chips used are normally about one-eighth inch thick and measure about one-quarter inch along their other two dimensions. It is not essential that the chips be of regular size or shape. Since the air flows through a chip held between the chip holders along radial paths, moderate variations in size or shape have no significant effect upon the measurements obtained with the permeameter. By considering the pressure gradients and air-flow paths within a chip held in the device, it can be shown mathematically that this is true.

To test either a standard or a sample chip with the permeameter, the chip clamping mechanism is first opened by pushing down on the end of latch spring 48. This results in movement of clamping rod 42, guard 46, barrel 50 and upper chip holder 56 upwardly away from lower chip holder 19 and knob 35 in response to force exerted by spring 47. After the chip holding mechanism has thus been opened, the piston assembly is moved to its lowermost position in the cylinder by pushing down on knob 35. Since spring retainer 37 is fixed on piston rod 20, downward movement of the rod compresses spring 39. The piston rod is locked in place by moving it to the side so that notch 36 engages the side of frame 32. Care should be taken in depressing the knob to avoid jamming diaphragm 23 in the cylinder. If the opening in the lower chip holder 19 is blocked or the knob is pressed down too rapidly, the diaphragm may be turned inside out because of excessive pressure in the lower part of the cylinder and may not operate properly during the return stroke of the piston. If this occurs, it may be necessary to disassemble the apparatus and reposition the diaphragm. The position of the guard adjacent knob 35 when the upper chip holder and associated elements are in their lowermost position normally prevents inadvertent movement of the piston rod. To simplify repositioning of the diaphragm should it become reversed, an opening may be drilled through cover 26 into the upper part of the cylinder and provided with a fitting through which compressed air can be introduced. By using a small amount of air from a truck tire or similar source to reposition the diaphragm in the event that it becomes reversed, the necessity for disassembling the apparatus in the field can usually be avoided.

After the piston rod has been locked in place with the piston assembly in the lower part of the cylinder, a clean dry chip is centered on lower chip holder 19 over the opening therein. If the chip to be tested is a sample of unknown permeability, it will preferably be about the same size and shape as the standards but, as pointed out earlier, small differences in chip size and shape generally do not have any appreciable effect upon the results obtained. The chips used must be free of oil and water. If either is present, it should be removed with a suitable solvent, a mixture of thirty percent ethanol and seventy percent chlorothene for example. After the chip has been positioned, the guard is pushed down so that upper chip holder 56 rests on the chip. Spring 55 in barrel 50 is loaded by further pushing down on the guard until pin 52 is just above the bottom of slots 53 and 54. This will assure an essentially uniform seal against the chip during each test. The upper chip holder 56 should form a chip-to-rock seal but should not touch lower chip holder 19 to form a seal between the holders.

Following placement of the chip as described above, piston rod 20 is pushed back to disengage notch 36 from frame 32. Spring 39 thereupon starts the piston assembly moving upwardly in the cylinder. Timing is started with a stop watch or similar device at the instant the piston rod is released. As the piston assembly moves upwardly in the cylinder, a slight vacuum is created below the diaphragm and air flows through the chip into the cylinder. The time required for pointer 40 to reach a preselected reference line 41 on spacer 31 is recorded. The speed of the piston movement will determine the mark to be used. It is preferred that the mark selected be one which will give a time value between about 10 and about 300 seconds. Experience has shown that accuracy of the results obtained sometimes suffers when timed intervals outside this range are used. It is sometimes advantageous to control the time values obtained by employing two or more piston springs, a stiff spring being used for chips of low permeability and a weaker spring being employed for the chips of high permeability.

In utilizing the permeameter in the field, it is preferred to test a set of standard chips and prepare calibration curves before chips of unknown permeability are tested. The time interval required for movement of the piston assembly to the reference marks are plotted against permeability values of the standard chips on logarithmic paper. FIGURE 3 of the drawing shows a typical set of curves obtained with standard chips of Alundum and porcelain. Readings were taken at each of the reference lines 41a, 41b, 41c and 41d. It will be noted that the values obtained plot as smooth lines exhibiting a small amount of curvature. Theoretically, a series of straight lines should be obtained when the time values are plotted against permeability in this manner. It is believed that the lines curve because the bending resistance of the diaphragm changes slightly as the speed of movement of the piston changes. Regardless of the reason for the curvature, it has been found that the curves obtained are readily reproducible so long as the temperature and atmospheric pressure remain essentially unchanged. Since these change from day to day, a new set of calibration curves should be prepared each time the permeameter is used.

A series of sample chips will ordinarily be tested with the permeameter and a set of calibration curves such as that shown in FIGURE 3 of the drawing in order to determine the permeability of a particular stratum. Experience has shown that vugs, grain-size variations, clay laminae, very thin streaks of shale and similar features of individual chips may cause considerable variation in the permeability values obtained and that the use of an average of several values is therefore advisable. In some formations, variations in permeability over very short distances will be large and therefore only permeability ranges should be utilized. In general, however, it has been found that the results obtained with the permeameter correlate very well with those obtained by testing cores in standard API Code 27 apparatus. The permeability values obtained with the permeameter of the invention are therefore considered thoroughly reliable.

It will be understood that several modifications may be made in the apparatus depicted in FIGURES 1 and 2 of the drawing without departing from the scope of the invention. Such modifications will readily be apparent to those skilled in the art and hence it is intended that the invention be limited only by the scope of the appended claims.

What is claimed is:
1. An improved permeameter comprising in combination a supporting member containing a generally cylindrical chamber, an axial port at one end of said chamber, and a passageway extending from the other end of said chamber to an opening in the surface of said supporting member; an annular resilient chip holder mounted on said supporting member about said opening therein; a piston axially slidable in said chamber; a flexible impervious diaphragm affixed to said piston and to the surrounding wall of said chamber intermediate said port and said passageway; a piston rod attached to said piston slidably extending through said port in said supporting member; means for urging said piston rod into an extended position with respect to said supporting member; means for locking said piston rod in a retracted position with respect to said supporting member; an imperforate resilient chip holder aligned with and movable axially toward said annular chip holder; and means for supporting and moving said imperforate chip holder to compress a chip of solid material between said annular and imperforate chip holders.

2. A permeameter as defined by claim 1 wherein said means for supporting and moving said imperforate chip holder includes a frame mounted on said supporting member; a clamping rod supported by said frame and axially slidable with respect thereto; a barrel slidably mounted on said clamping rod and dependent therefrom, said imperforate chip holder being mounted on the end of said barrel; a spring normally urging said barrel in an extended position with respect to said clamping rod; and latching means for holding said clamping rod in a fixed position with respect to said frame.

3. A permeameter as defined by claim 1 wherein a spring retainer is mounted on said piston rod without said chamber and said means for urging said rod into an extended position with respect to said supporting member comprises a helical spring mounted on said rod between said retainer and said supporting member.

4. A permeameter as defined by claim 2 wherein a guard is attached to the end of said clamping rod opposite said barrel and extends over the end of said piston rod projecting from said chamber.

References Cited in the file of this patent
UNITED STATES PATENTS

| | | |
|---|---|---|
| 2,534,737 | Rose | Dec. 19, 1950 |
| 2,659,433 | Brown | Nov. 17, 1953 |
| 2,846,983 | Otto | Aug. 12, 1958 |
| 2,851,957 | Ragland | Sept. 16, 1958 |
| 2,992,770 | Keiser | July 18, 1961 |